United States Patent [19]

Pettypiece, Jr.

[11] Patent Number: 5,223,709
[45] Date of Patent: Jun. 29, 1993

[54] SPHERICAL OPTICAL ENCODER FOR DETECTING THE POSITION AND MOTION ABOUT THREE MUTUAL ORTHOGONAL AXES

[75] Inventor: Robert P. Pettypiece, Jr., Clearwater, Fla.

[73] Assignee: Honeywell Inc., Minneapolis, Minn.

[21] Appl. No.: 754,382

[22] Filed: Sep. 3, 1991

[51] Int. Cl.⁵ .............................................. G01D 5/34
[52] U.S. Cl. .................................. 250/229; 250/221; 250/231.12; 340/709
[58] Field of Search ................... 250/231.12, 221, 229; 340/709

[56] References Cited

U.S. PATENT DOCUMENTS 3,915,019 10/1975 Zoltan ............................ 250/231.12
4,958,071 9/1990 Scott-Jackson et al. ........... 250/229

Primary Examiner—David C. Nelms
Assistant Examiner—T. Davenport
Attorney, Agent, or Firm—Donald J. Lenkszus

[57] ABSTRACT

A position detecting apparatus in the form of a sphere movable about three mutually orthogonal axes and employing optical encoding such as gray scale encoding and detector so positioned that motion about any of the three orthogonal axes is detected by one and only one of the detector.

16 Claims, 1 Drawing Sheet

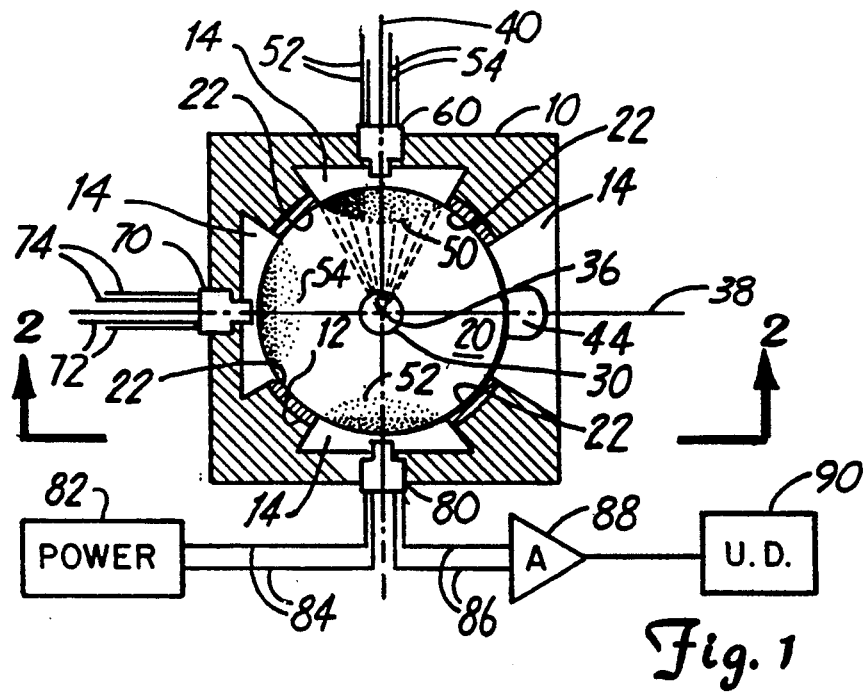
*Fig. 1*
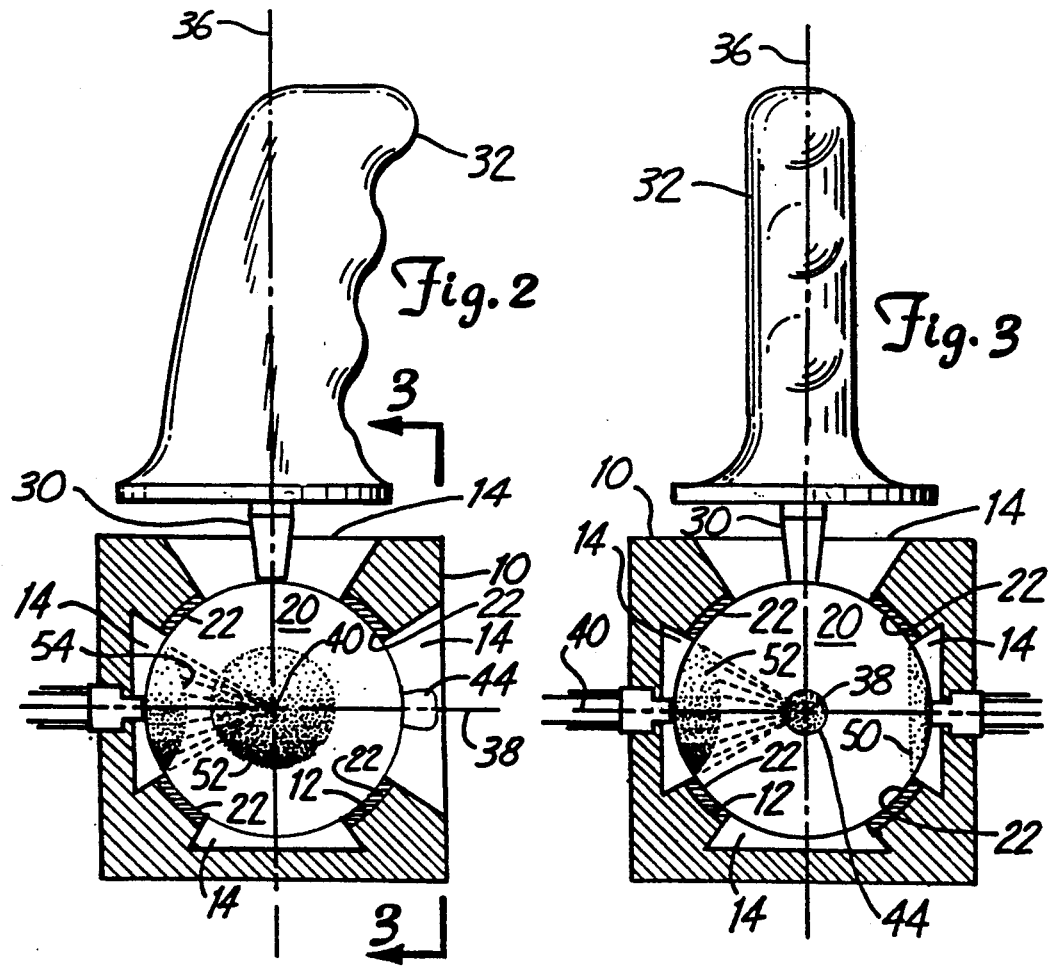
*Fig. 2*  *Fig. 3*

SPHERICAL OPTICAL ENCODER FOR DETECTING THE POSITION AND MOTION ABOUT THREE MUTUAL ORTHOGONAL AXES

BACKGROUND OF THE INVENTION

The present invention relates to optical encoders and more particularly to a spherical optical encoder which can determine angular position of a member around each of three mutually orthogonal axes. One intended use for the invention is to provide apparatus for use with hand operated controller which supplies signals to control remote systems such as robot arms, air or space craft, free fliers and the like.

Hand operated controllers are designed for specific purposes in controlling robots, aircraft and spacecraft and each have specific features useful for particular applications. For example, in the co-pending Israel Menahem U.S. Pat. No. 5,142,931, and the Israel Menahem et al. U.S. Pat. No. 5,182,961 filed Jul. 30, 1991 unique mechanisms are shown for use with a hand grip in which all three axes intersect within a cavity and which allow motion in strictly linear fashion along three orthogonal axes. A number of other prior art references show hand controllers that provide an output indicative of movement around a pivot point. In the usual hand controller mechanism, suitable detectors are employed for determining the amount of linear or angular motion of the hand controller in a predetermined direction or about the pivot to supply the signal to the remote control devices.

None of the prior art has, however, provided a single unitary structure which will provide outputs around more than one axis without using complicated levers and extensions for providing such outputs.

SUMMARY OF THE INVENTION

The present invention provides for a three axis mechanism operable to supply outputs about each of three mutually orthogonal axes when a member such as a hand controller is moved in three directions. The mechanism is such that there is no cross-coupling between outputs in the other axes. The present invention employs a single spherical member mounted within a spherical cavity of a housing and through which a member for connection to the hand controller is provided. Along the outer surface of the spherical member, there is provided an optical readout such as a gray scale marking in three separate location, each of which locations is chosen so that the markings will provide outputs indicative of rotation of the spherical member about each of the mutually orthogonal axes. Detectors are mounted through the housing so as to be able to read the three gray scale areas and the detectors operate to supply the desired outputs to the remote control apparatus as desired.

BRIEF DESCRIPTION OF THE DRAWINGS

FIG. 1 shows a top view of the optical encoder of the present invention;

FIG. 2 shows a side view taken along lines 2—2 of FIG. 1; and

FIG. 3 shows a front view taken along lines 3—3 of FIG. 1.

DETAILED DESCRIPTION OF THE PREFERRED EMBODIMENTS

In the figures, a housing 10 is shown in which a cavity 12 is formed in substantially a spherical shape except for a plurality of cutout portions 14 which, as will be explained, are shaped to permit limited rotational motion of a spherical member 20 which is mounted within the cavity 12. Supporting the spherical member 20 within cavity 12 are a plurality of bearing surfaces 22 which are made of a material such as teflon plastic so as to be low in friction and to allow rotational movement of spherical member 20 in any desired direction.

When used as a hand controller, the apparatus attached to spherical member 20 will include a mounting post 30 to which a hand grip 32 may be attached as is seen in FIGS. 2 and 3. An operator maneuvering a craft or robot arm with hand grip 32 may desire to push it forward, to the side, or twist it about an axis perpendicular thereto so as to control the motion of an object in, for example pitch, roll and yaw respectively. In FIG. 1, the yaw axis as shown as a point which represents a line extending into and out of a plane of FIG. 1. In FIGS. 2 and 3, the yaw axis 36 is shown as a vertical line extending through the center of the spherical member 20. In FIGS. 1 and 2 the roll axis 38 is shown as a horizontal line extending through the center of sphere 20 and in FIG. 3 the roll axis 38 is shown as point in the center of sphere 20 extending into and out of the plane of FIG. 3. In FIG. 1, the pitch axis 40 is shown as a vertical line extending through the center of sphere 20 and in FIG. 3 the pitch axis 40 is shown as a horizontal line extending through the center of the sphere 20. In FIG. 2, the pitch axis 40 is shown as a point in the center of sphere 20 extending into and out of the plane of FIG. 2.

A pin 44 is shown in FIGS. 1, 2 and 3 extending from the surface of sphere 20 into one of the apertures 14. The purpose of pin 44 is to limit the rotation of sphere 20 within cavity 12 to predetermined amounts determined by the size of aperture 14. It is seen that pin 44 will abut against housing 10 at the edges of aperture 14 after a predetermined amount of rotation about the yaw axis 36 and pitch axis 40 (but not about roll axis 38). The post 30 which holds a hand grip 32 also acts to limit the motion of sphere 20 in the same manner but for rotations about roll axes 38 and pitch axis 40 (not about yaw axis 36). Both post 30 and pin 44 are necessary to limit three degrees of motions since, although post 30 can limit the motion of sphere 20 about the pitch and roll axes, it cannot limit the motion of the sphere 20 about the yaw axis. Pin 44, however, can limit the motion of sphere 20 about the yaw axis and the pitch axis but not the roll axis. Accordingly, with both post 30 and pin 44 limited motion about all three axes is made possible.

At three positions around the exterior surface of sphere 20 an area of varying density or reflectivity is painted, etched or otherwise laid down for purposes to be hereinafter described. For example, in FIG. 1, on the upper portion of sphere 20 and on the right side of FIG. 3, a first area 50 is shown having low density or nearly complete reflectivity as shown by the white portion on the right side and high density or nearly no reflectivity as shown by the black portion on the left side. The area between white and black comprise different shades of gray. In actuality, the preferred embodiment uses a gray scale at area 50 which resembles the central portions of a plurality of lines that extend like lines of latitude between the two points where the yaw axis 36 intersects the surface of sphere 20. The central portion of each of the lines that lie within area 50 will have a reflectivity of predetermined value for that line. Then, as one scans over the lines from the right side to the left side of the area 50, the amount of reflectivity continually decreases from white to black. It is therefore seen that by determining the reflectivity at any point in area 50 the amount of rotation of sphere 20 around yaw axis 36 will be determinable.

A second gray scale area 52 is shown on the bottom of sphere 20 in FIG. 1, in the center of sphere 20 in FIG. 2 and at the left of sphere 20 in FIG. 3. Area 52 is like that shown for area 50 and consists of lines of varying reflectivity which extend across the bottom of sphere 20, but in this case, the lines extend to intersect the points where roll axis 38 intersects the surface of sphere 20. Area 52 starts with the low density, maximum reflectivity on the top in FIG. 2 and gradually decreasing reflectivity as the area approaches the bottom. In other words, as with area 50 the lines having the same reflectivity, and like portions of latitudes over the area 52. Thus, as the sphere 20 rotates about roll axis 38, different amounts of reflectivity will be facing downwardly in the FIG. 1.

A third gray scale area 54 is seen on the left side of sphere 20 in FIGS. 1 and 2. Area 54 like areas 50 and 52 consists of a plurality of lines like latitudes but extending between the points where pitch axis 40 intersects the surface of sphere 20. These lines, as with areas 50 and 52 will increase in reflectivity from the top side of the sphere 20 in FIG. 2 to the bottom side as shown. Thus, any rotation of sphere 20 about axis 40 will provide different lines of reflectivity on the left side of FIG. 1.

To detect the amount of reflectivity being presented at one of the selected points of area 50, 52 or 54, a plurality of light emitting and reflection receiving light responsive detectors are supplied. In FIG. 1, the upper gray scale area 50 is scanned by a detector 60 mounted through an upper portion of housing 10 and extending near the surface of sphere 20 near the center of area 50. Detector 60 includes a pair of conductors 52 which are connected to a power source (not shown) and operate to illuminate a radiation source within the detector 60 pointed downwardly so that light leaves detector 60 and is reflected off the surface of the sphere 20. Such reflected light is received by sensors in detector 60 and converted into an electrical signals which are presented to conductors 54 in FIG. 1. Thus, the area 50 of surface 20 will be illuminated and the amount of reflected light from the surface will be detected by detector 60 as an indication of the rotational position of sphere 20 about yaw axis 36. It should be noted that rotation about axis 38 or about axis 40 will not affect the output of detector 60, since no change of the reflectivity portion of area 50 will have occurred due to these rotations.

On the left side of FIG. 1, a detector 70 extends through the housing 10 and lies immediately adjacent the surface of sphere 20 near the center of area 54. Like detector 60, detector 70 is supplied with energy by conductors 72 so as to illuminate the surface of sphere 20. Energy reflected from the gray scale area 54 is detected by sensors in detector 70 and converted into an electrical signals which are presented to conductors 74. As with detector 60, detector 70 produces an output indicative of rotation of sphere 20 but this time about pitch axis 40, since with such rotation, different amounts of reflectivity will be closely adjacent to the surface of detector 70. Likewise, any rotation about axis 36 or 38 will not be detected by detector 70 since it will not change the reflectivity of area 54.

Finally, a third detector 80 mounted in the bottom of housing 10, is shown in position adjacent to the surface of sphere 20 and proximate to the center of area 52. Detector 80 is supplied from a power source 82 and conductors 84 to a light within detector 80 which operates to illuminate the area 52. Energy reflected from area 52 is detected by sensors in detector 90 and converted into an electrical signal which is supplied over conductors 86 to an amplifier 88. The output of amplifier 88 is fed to a utilization device 90 for use in controlling the position of an aircraft, spacecraft or robot arm. For simplicity, power source 82, amplifier 88 and utilization device 90 have been shown only in connection with detector 80 of FIG. 1. It will be understood, however, that similar power sources, amplifiers and utilization devices will be connected to detectors 60 and 70 in similar fashion. Detectors 60, 70 and 80 may be of the type identified as the HBCS-1100 manufactured by Hewlett Packard.

It is therefore seen that I have supplied a spherical optical encoder in which a single moving part is utilized to supply outputs indicative of motion about three mutually orthogonal axes in a straight forward, simple and efficient manner. It is also seen that no cross-coupling occurs between outputs and the three axes. It should also be noted that while I have shown three gray scaled areas to produce outputs indicative of rotational position, other standard types of optical or other encoding may be used. It should also be noted that while I have shown detectors which illuminate areas 50, 52 and 54, it would be possible to have a source of light within sphere 20 so that the varying density of the latitude-like lens areas 50, 52 and 54 would allow more light to reach detectors 60, 70 and 80 through a light transmissive surface of sphere 20. Finally, it should be noted that while I have shown areas 50 and 52 to located 180° apart around sphere 20 with respect to each other, it is only necessary that the gray scaled areas 50, 52 and 54 be such that their latitude-like lines intersect on the points of intersection between the various three orthogonal axes and the sphere 20. In other words, area 52 in FIG. 1 could be rotated up to be occupying the area where post 30 is shown, so long as the lines representing common amounts of reflectivity intersect at the points where roll axis 38 intersects the surface of sphere 20.

Although the present invention has been described with reference to preferred embodiments, workers skilled in the art will recognize that changes may be made in form and detail without departing from the spirit and scope of the invention.

What is claimed is:

1. Three axis position encoder apparatus comprising, in combination:

housing means;

a spherical member having a surface; first, second and third detectors mounted to said housing in an internal spherical cavity at three spaced positions;

means mounting the spherical member in the cavity of the housing for movement about each of three mutually orthogonal axes;

first markings on a first portion of the surface of said spherical member normally adjacent to a first of the three detectors so that movement of the spherical member about a first of the three mutually orthogonal axes produces a change in the output of the first detector indicative of the position of the spherical member about the first axis;

second markings on a second portion of the surface of said spherical member normally adjacent to a second of the three detectors so that movement of the spherical member about a second of the three mutually orthogonal axes produces a change in the output of the second detector indicative of the position of the spherical member about the second axis; and third markings on a third portion of the surface of said spherical member normally adjacent to a third of the three detectors so that movement of the spherical member about a third of the three mutually orthogonal axes produces a change in the output of the third detector indicative of the position of the spherical member about the third axis.

2. Apparatus according to claim 1 wherein at least one of the three spaced positions is ninety degrees from the other two.

3. Apparatus according to claim 2 wherein the other two positions are one hundred and eighty degrees apart.

4. Apparatus according to claim 1 wherein the detectors are optical detectors which change outputs with changes in reflected energy from the spherical member.

5. Apparatus according to claim 4 wherein the detectors include means for projecting energy onto the surface of the spherical member and include means for receiving the reflected energy from the surface as it is altered by the markings.

6. Apparatus according to claim 1 wherein the first, second and third markings comprise a plurality of lines which have substantially the same reflectivity along each line but which increase reflectivity in a direction perpendicular to the lines so as to cover an area which is moveable in the such perpendicular direction under the first, second and third detectors respectively as the spherical member moves about the first, second and third axes.

7. Apparatus according to claim 6 wherein the lines in each of the areas would if extended, intersect at the points on the sphere defining the axes about which the spherical member moves.

8. Apparatus according to claim 7 wherein the first, second and third detectors include means to illuminate the first, second and third areas respectively and to receive radiation reflected from the areas in a value indicative of the reflectivity of the encoding to produce first, second and third outputs indicative of the rotational position of the spherical member about the first, second and third axes respectively.

9. Apparatus according to claim 8 wherein the first and second areas are displace 180 degrees from each other and the third area is displace 90 degrees from the first and second areas.

10. A spherical position encoder apparatus comprising, in combination:

housing means;

a spherical member having a surface;

first, second and third detectors mounted to said housing in an internal spherical cavity at three spaced positions;

means mounting the spherical member in the interior cavity of the housing for movement about each of three mutually orthogonal axes;

first gray scale markings on a first portion of the surface of said spherical member normally detectors so that movement of the spherical member about a first of the three mutually orthogonal axes produces a change in the output of the first detector indicative of the position of the spherical member about the first axis;

second gray scale markings on a second portion of the surface of said spherical member normally adjacent to a second of the three detectors so that movement of the spherical member about a second of the three mutually orthogonal axes produces a change in the output of the second detector indicative of the position of the spherical member about the second axis; and third gray scale markings on a third portion of the surface of said spherical member normally adjacent to a third of the three detectors so that movement of the spherical member about a third of the three mutually orthogonal axes produces a change in the output of the third detector indicative of the position of the spherical member about the third axis.

11. Apparatus according to claim 10 wherein at least one of the three spaced positions is ninety degrees from the other two.

12. Apparatus according to claim 11 wherein the other two positions are one hundred and eighty degrees apart.

13. Apparatus according to claim 10 wherein the detectors are optical detectors which change outputs with changes in reflected energy from the spherical member.

14. Apparatus according to claim 13 wherein the detectors include means for projecting energy onto the surface of the spherical member and include means for receiving the reflected energy from the surface as it is altered by the gray scale markings.

15. Apparatus according to claim 10 wherein the first, second and third gray scale markings comprise a plurality of lines which have substantially the same reflectivity along each line but which increase reflectivity in a direction perpendicular to the lines so as to cover an area which is moveable in the such perpendicular direction under the first, second and third detectors respectively as the spherical member moves about the first, second and third axes.

16. Apparatus according to claim 15 wherein the lines in each of the areas would, if extended, intersect at the points on the sphere defining the axes about which the spherical member moves.

* * * * *